(No Model.)

J. D. LLOYD.
STEAM PRESSURE GAGE TRAP.

No. 281,533. Patented July 17, 1883.

Witnesses
S. N. Piper
E. A. Pratt

Inventor,
John Davis Lloyd.
by R. H. Eddy atty.

UNITED STATES PATENT OFFICE.

JOHN D. LLOYD, OF BOSTON, MASSACHUSETTS.

STEAM-PRESSURE-GAGE TRAP.

SPECIFICATION forming part of Letters Patent No. 281,533, dated July 17, 1883.

Application filed May 15, 1883. (No model.)

*To all whom it may concern:*

Be it known that I, JOHN DAVIES LLOYD, of the district of Charlestown, in the city of Boston, in the county of Suffolk, of the Commonwealth of Massachusetts, have invented a new and useful Improvement in Steam-Pressure-Gage Traps; and I do hereby declare the same to be described in the following specification and represented in the accompanying drawings, of which—

Figure 1:
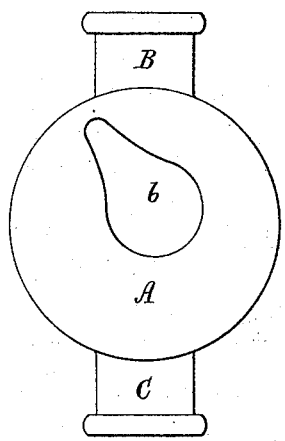
Figure 2:
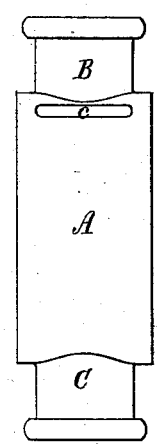
Figure 3:
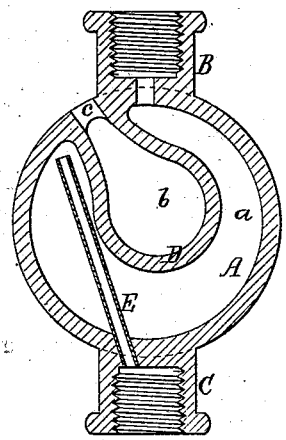
Figure 4:
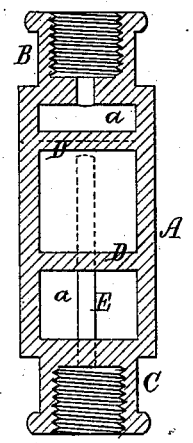

Figure 1 is a side view, Fig. 2 an edge elevation, Fig. 3 a vertical and longitudinal section, and Fig. 4 a transverse section, of a trap of my improved kind.

The trap is for use with a steam-pressure gage of the Bourdon class, and is to condense steam and prevent it from entering the expansible tube of the gage. Traps for such purpose are in common use; but mine is of a different construction.

In the drawings, A denotes a hollow cylinder or drum, having a female-screw-connection neck, B, at its top, and another, C, at its bottom. The neck B opens into the interior space, a, of the drum, and is to connect the trap with a steam-gage in such manner as to open communication between the bore of its expansible tube and the interior space, a, of the trap. Extending through the trap from end to end thereof there is a pear-shaped partition, D, and there is through each head of the drum a pear-shaped opening, b, that leads out of the space within the partition. There is also a slot, c, that leads through the periphery of the drum and into the pear-shaped space within the partition. Furthermore, a pipe, E, opening out of the interior of the neck C, leads upward within the drum and aside of the pear-shaped partition, in manner as represented, such pipe being open at its upper end.

From the above it will be seen that as the space inclosed by the pear-shaped partition is open not only at its upper part but at its sides to the external atmosphere, such can flow freely into and out of such space, and in so doing abstract heat from the partition when the trap is charged with condensed steam.

When the trap is in use the steam will flow through the pipe E, and thence into the drum, and will pass around the partition and out of the drum and into the expansion-tube of the gage, and will be condensed therein until the said tube and the trap may have become charged with water. The steam that may subsequently enter the drum through the pipe E will keep the water in the drum and gage-tube, and such water will prevent the steam from entering the gage-tube to heat it too much.

I claim—

The steam-pressure-gage trap, substantially as described, consisting of the drum and its necks, induction-tube, and the internal curved partition, arranged as set forth, the drum being provided with one or more openings leading, as explained, out of the space within the said partition.

JOHN DAVIES LLOYD.

Witnesses:
R. H. EDDY,
E. B. PRATT.